July 30, 1940.　　　J. KRASOWSKI　　　2,209,778
DECORATIVE COVERING FOR FLOWERPOTS AND THE LIKE
Filed Aug. 5, 1939
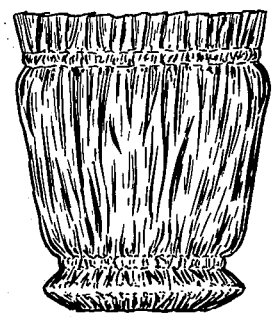
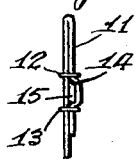
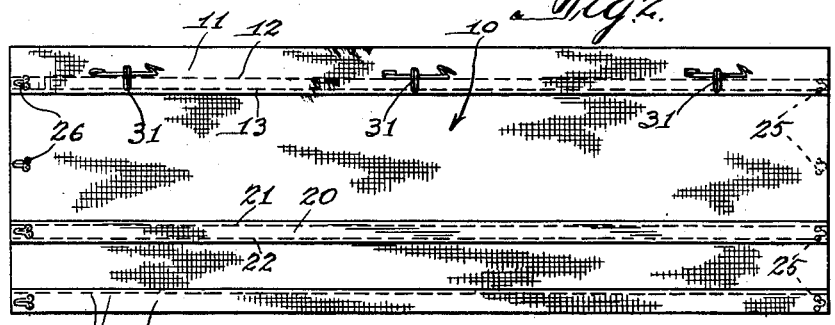
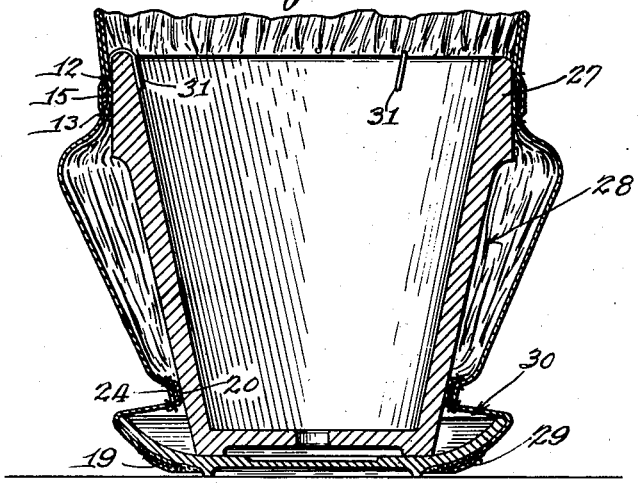
Inventor:
JOSEPHINE KRASOWSKI Patented July 30, 1940

2,209,778

UNITED STATES PATENT OFFICE 2,209,778

DECORATIVE COVERING FOR FLOWERPOTS AND THE LIKE

Josephine Krasowski, Chicago, Ill.

Application August 5, 1939, Serial No. 288,540

10 Claims. (Cl. 41—10)

This invention relates to a decorative covering for a flowerpot or the like and has special reference to means for removably covering the ordinary unsightly exteriors of flowerpots or the like to effect an ornamental appearance thereof.

More particularly, this invention relates to a decorative covering for a flowerpot and support therefor comprising a tubular sheet of flexible material, and binding strips adjacent the upper and lower edges of the sheet and intermediately thereof, the upper and intermediate binding strips engaging the flowerpot and the lower binding strip engaging the support.

Greenhouses and florist shops ordinarily grow plants in clay pots which are porous to water and are placed on a moist bench of earth, sand, or cinders. As the pot walls dry out by evaporation, the pot takes moisture from the moist bench. Owing to this type of care, such flowerpots are ordinarily discolored from water seepage, handling, and the like, and present such an unsightly exterior appearance that it is necessary either to transplant the plants contained therein to an ornamentally decorated pot or to cover the pot obtained from the florist shop or greenhouse with a suitable covering.

The ordinary clay pots are provided with holes in the bottoms thereof through which excess water may drain or through which water may be absorbed. Good drainage is ordinarily necessary for the successful growth of a plant and, therefore, in the use of the clay pot, a support in the form of a receptacle or container is usually provided for receiving the apertured bottom of the pot. An ordinary saucer from the kitchen is employed to support the pots. Painting of the flowerpot is not very successful since the paint becomes worn and chipped and is hard to renew. It is unsatisfactory to attempt to paint a saucer a color corresponding to or contrasting with the color of a flowerpot. The present invention, therefore, contemplates the provision of a covering for both the flowerpot and the support therefor, the covering being detachable for cleaning or repair and being formed of a flexible material to match or contrast with the material of drapes and like room furnishings.

The present invention further contemplates the provision of a cover for both the flowerpot and the support therefor in which binding strips are employed to secure the cover to both the flowerpot and the support in such a manner that by moving the flowerpot the support will likewise be caused to move therewith. For example, should the flowerpot be raised from a supporting surface, the saucer will likewise be raised therefrom so that the latter will not be accidentally separated, with danger of the saucer being broken.

One of the objects of this invention is to provide a decorative covering for a flowerpot and support therefor of the character indicated above which is comparatively inexpensive to manufacture, and is simple and efficient in operation.

Another object of this invention is to provide a decorative covering for a flowerpot and support therefor of the hereinabove noted type in which the flowerpot and support are held against accidental separation.

Other objects and advantages of this invention will hereinafter be more particularly pointed out and, for a more complete understanding of the characteristic features of this invention, reference may now be had to the following description when taken together with the accompanying drawing, in which latter:

Figure 1 is a front elevational view of the decorative covering for a flowerpot and support therefor, embodying the features of this invention, the covering being attached to the flowerpot;

Fig. 2 is an elevational view of the covering of Fig. 1, showing the sheet in an extended condition;

Fig. 3 is an end elevational view of Fig. 2; and

Fig. 4 is an enlarged vertical central sectional view of the construction shown in Fig. 1.

Referring now more particularly to the drawing, the decorative covering embodying the features of this invention comprises a sheet of flexible material 10 which may be of fabric, rubberized or oiled silk, or like materials. It may be preferable to use the same fabric and same decorative motif as in the furnishings of the room such, for example, as the drapes of the living or dining rooms or the bedspread in the bedroom.

A hem 11 is formed on the upper edge of the sheet of flexible material 10 by turning a marginal portion of the material of the sheet over on itself. Stitches 12 and 13 are taken in the hem in a spaced relation to form a pocket 14 for receiving an elastic 15 which latter forms the upper binding strip. A similar hem 16 is formed from a marginal portion of the lower edge of the sheet by turning the sheet material back on itself. Stitches 17 are taken in the hem in a spaced relation with the folded edge thereof to provide a pocket 18 for receiving an elastic 19 which latter forms the lower binding strip. Intermediate the upper and lower hems a strip of material 20 is fixed along the edges thereof to the sheet of flexible material 10, stitches 21 and 22 being taken in a spaced relation to form a pocket 23 for receiving an elastic 24 which latter forms the intermediate binding strip.

The opposed ends of the sheet of flexible material are provided with eyes 25 and hooks 26 for detachably joining the sheet into tubular form. It is, of course, to be understood that the ends of the sheet may be sewed or otherwise fixedly or separably fastened together to form a tubular sheet although for convenience in attaching and detaching the cover to and from a flower pot it has appeared to be desirable to use a separable fastener for joining the opposed ends.

In fastening the decorative covering about a flowerpot and support therefor, the sheet of flexible material in its extended condition as shown in Fig. 2 is arranged to encircle the flowerpot and support, with the hooks 26 being fastened in the eyes 25. The upper binding strip preferably seats on the collar 27 of a flower pot 28 and the intermediate binding strip rests against the main body portion adjacent the lower end thereof. The lower binding strip engages beneath the sides 29 of the support 30, the support being a usual saucer in which the bottom of the flowerpot rests.

In order that the top edge of the tubular sheet be disposed a predetermined distance above the upper peripheral rim of the flowerpot, a plurality of hook-shaped members 31 are secured to the sheet near the upper end thereof, the hook-shaped member detachably engaging the rim of the flowerpot. Aside from the ordinary function of predetermining the height of the tubular sheet above the rim of the flowerpot, the hook-shaped members 31 have the further function of preventing the covering from accidentally slipping along the side walls of the flowerpot, which walls are ordinarily either substantially perpendicular or converge in the direction of the support when viewed in cross section.

In lifting the flower pot 28 it will be readily apparent that the saucer 30 or other detachable support for the bottom of the flowerpot will likewise be raised since the binding strip engages beneath the sides of the dish-shaped support. In this instance the direction of inclination of the sides of the dish-shaped support is opposed to the force applied in raising the dish and the binding strips are of suitable strength to support the dish. Thus an accidental disengagement of the support and flowerpot is prevented.

While but a single embodiment of this invention is herein shown and described, it is to be understood that various modifications thereof may be apparent to those skilled in the art without departing from the spirit and scope of this invention and, therefore, the same is only to be limited by the scope of the prior art and the appended claims.

I claim:

1. A decorative covering for a flowerpot and a detachable support therefor, comprising a tubular sheet of flexible material, and binding strips adjacent the upper and lower edges of said sheet and intermediately thereof, said upper and intermediate binding strips engaging the flowerpot and said lower binding strip engaging the support.

2. A decorative covering for a flowerpot and a detachable support therefor, comprising a sheet of flexible material, binding strips adjacent the upper and lower edges of said sheet and intermediately thereof, said upper and intermediate binding strips engaging the flowerpot and said lower binding strip engaging the support, and means for detachably joining opposed end edges of said sheet.

3. A decorative covering for a flowerpot and support therefor, comprising a tubular sheet of flexible material, and elastic binding strips adjacent the upper and lower edges of said sheet and intermediately thereof, said upper and intermediate binding strips engaging the flowerpot and said lower binding strip engaging the support.

4. A decorative covering for a flowerpot and support therefor, comprising a tubular sheet of flexible material, binding strips adjacent the upper and lower edges of said sheet and intermediately thereof, said upper and intermediate binding strips engaging the flowerpot and said lower binding strip engaging the support, and means on said sheet for detachably engaging the upper peripheral edge of the flowerpot.

5. A decorative covering for a flowerpot and a detachable support therefor, comprising a tubular sheet of flexible material, binding strips adjacent the upper and lower edges of said sheet and intermediately thereof, said upper and intermediate binding strips engaging the flowerpot and said lower binding strip engaging the support, and a plurality of hook-shaped members mounted on said sheet adjacent said upper binding strip for engaging the peripheral edge of the flowerpot.

6. A decorative covering for a flowerpot and a detachable support therefor, comprising a sheet of flexible material, binding strips adjacent the upper and lower edges of said sheet and intermediately thereof, said upper and intermediate binding strips engaging the flowerpot and said lower binding strip engaging the support, means for detachably joining opposed end edges of said sheet, and means on said sheet for detachably engaging the peripheral edge of the flowerpot.

7. A decorative covering for a flowerpot and support therefor, comprising a tubular sheet of flexible material, pockets formed in said material adjacent the upper and lower edges of said sheet and intermediately thereof, and elastics in said pockets, said upper and intermediate elastics encircling the flowerpot and said lower elastic encircling the support.

8. A decorative covering for a flowerpot and a detachable support therefor, comprising a sheet of flexible material, pockets formed in said sheet adjacent the upper and lower edges thereof and intermediately thereof, an elastic enclosed by each of said pockets, said upper and intermediate elastics encircling the flowerpot and said lower elastic encircling the support, and means for detachably joining opposed end edges of said sheet.

9. A decorative covering for a flowerpot having an opening in its bottom and a dish-shaped support in which said bottom rests, comprising a tubular sheet of flexible material, binding strips adjacent the upper and lower edges of said sheet and intermediately thereof, said upper and intermediate binding strips engaging the flowerpot and said lower binding strip engaging beneath the sides of the dish-shaped support, and a plurality of hook-shaped members secured to said sheet near the upper end thereof for detachably engaging the rim of the flowerpot.

10. A decorative covering for a flowerpot having an opening in its bottom and a detachable dish-shaped support in which said bottom rests, comprising a sheet of flexible material, binding strips adjacent the upper and lower edges of said sheet and intermediately thereof, said upper and intermediate binding strips engaging the flowerpot and said lower binding strip engaging beneath the sides of the dish-shaped support, means for detachably joining opposed end edges of said sheet, and hook-shaped members secured to said sheet near the upper end thereof for detachably engaging the rim of the flowerpot.

JOSEPHINE KRASOWSKI.